United States Patent
Mostoller et al.

(10) Patent No.: US 12,519,266 B2
(45) Date of Patent: Jan. 6, 2026

(54) CHARGING SYSTEM FOR A MOBILE DEVICE

(71) Applicant: TE Connectivity Solutions GmbH, Schaffhausen (CH)

(72) Inventors: Matthew Edward Mostoller, Hummelstown, PA (US); Christopher George Daily, Harrisburg, PA (US)

(*) Notice: Subject to any disclaimer, the term of this patent is extended or adjusted under 35 U.S.C. 154(b) by 583 days.

(21) Appl. No.: 18/085,604

(22) Filed: Dec. 21, 2022

(65) Prior Publication Data

US 2023/0344164 A1  Oct. 26, 2023

Related U.S. Application Data

(60) Provisional application No. 63/334,219, filed on Apr. 25, 2022.

(51) Int. Cl.
| | |
|---|---|
| H02J 7/00 | (2006.01) |
| H01R 13/453 | (2006.01) |
| H01R 13/52 | (2006.01) |
| H01R 13/631 | (2006.01) |

(52) U.S. Cl.
CPC ..... H01R 13/5202 (2013.01); H01R 13/4532 (2013.01); H01R 13/6315 (2013.01); H02J 7/0042 (2013.01)

(58) Field of Classification Search
USPC .............. 320/105, 106, 107, 108, 109, 110
See application file for complete search history.

(56) References Cited

U.S. PATENT DOCUMENTS

| | | | |
|---|---|---|---|
| 4,030,797 A | 6/1977 | Nieman | |
| 5,716,224 A | 2/1998 | Masuda et al. | |
| 2020/0389039 A1* | 12/2020 | Daily | H01R 13/745 |
| 2021/0333156 A1* | 10/2021 | Daily | H01R 13/6683 |
| 2023/0253727 A1* | 8/2023 | Daily | H01R 13/631 |
| | | | 439/136 |

FOREIGN PATENT DOCUMENTS

| | | |
|---|---|---|
| CN | 105470715 A | 4/2016 |
| CN | 111370908 A | 3/2020 |
| EP | 0232792 A1 | 8/1987 |

OTHER PUBLICATIONS

HBL61CM64—Weatherproof Straight Blade Inlet (3 pages).
International Search Report, International Application No. PCT/IB2023/054185 Apr. 24, 2023.

* cited by examiner

*Primary Examiner* — Brian Ngo

(57) ABSTRACT

A supply charging device includes a supply power connector having a supply housing coupled to a panel having a guide member configured to engage a guide feature of a receive power connector to guide mating. The supply power connector includes a door closing a supply contact chamber holding supply power contacts. The supply charging device includes a float element engaging the panel to allow floating of the supply power connector relative to the panel for aligning the mating end of the supply power connector with the receive power connector. A sealing boot is coupled to the housing and the panel to provide an environmental seal between the supply power connector and the panel. The sealing boot is flexible to maintain sealing as the supply power connector floats relative to the panel.

20 Claims, 12 Drawing Sheets

CHARGING SYSTEM FOR A MOBILE DEVICE

CROSS REFERENCE TO RELATED APPLICATIONS

This application claims benefit to U.S. Provisional Application No. 63/334,219, filed 25 Apr. 2022, titled "CHARGING SYSTEM FOR A MOBILE DEVICE", the subject matter of which is herein incorporated by reference in its entirety.

BACKGROUND OF THE INVENTION

The subject matter herein relates generally to charging systems for mobile devices.

Mobile devices, such as autonomous mobile robots, are movable within an environment to perform a task. However, the mobile devices need to be recharged from time to time. The mobile devices are returned to a charging device to supply power to the mobile device and recharge the batteries of the mobile device. As the mobile device returns to the charging station, the charging connector of the mobile device needs to be aligned with the charging connector of the charging station. However, when the mobile device is misaligned with the charging station, the mobile device is unable to recharge. Additionally, the charging device and the mobile device may be used in harsh environments and the charging components may be damaged by moisture, dirt, debris and the like.

A need remains for a sealed charging system capable of aligning the charging connector of a mobile device with the charging connector of a charging station.

BRIEF DESCRIPTION OF THE INVENTION

In one embodiment, a supply charging device for a mobile device is provided and includes a supply power connector has a supply housing extending between a front and a rear. The supply housing configured to be coupled to a panel. The supply power connector has a mating end at the front. The supply housing includes a supply contact chamber extends between the front and the rear. The supply housing includes a receptacle at the mating end configured to accept a receive power connector of the mobile device. The supply housing includes a guide member at the mating end forward of the receptacle configured to engage a guide feature of the receive power connector to guide the receive power connector of the mobile device into the receptacle. The supply power connector includes supply power contacts in the supply contact chamber. The supply power connector includes a door between the supply contact chamber and the receptacle. The door is movable between a closed position and an open position. The door restricts access to the supply contact chamber in the closed position from an exterior of the supply power connector. The supply charging device includes a float element coupled to the supply housing. The float element configured to engage the panel to allow the supply power connector to float relative to the panel for aligning the mating end of the supply power connector with the receive power connector. The supply charging device includes a sealing boot coupled to the supply housing and is configured to be sealed to the panel to provide an environmental seal between the supply power connector and the panel. The sealing boot is flexible to maintain sealing between the supply housing and the panel as the supply power connector floats relative to the panel.

In another embodiment, a supply charging device for a mobile device is provided and includes a supply power connector having a supply housing extending between a front and a rear. The supply housing is configured to be coupled to a panel. The supply power connector has a mating end at the front. The supply housing includes a supply contact chamber extends between the front and the rear. The supply housing includes a receptacle at the mating end configured to accept a receive power connector of the mobile device. The supply housing includes a guide member at the mating end forward of the receptacle configured to engage a guide feature of the mobile device to guide the receive power connector of the mobile device into the receptacle. The supply power connector includes a supply contact assembly received in the supply contact chamber. The supply contact assembly includes a supply contact holder holding supply power contacts. The supply contact assembly is movable relative to the supply housing. The supply power connector includes a door between the supply contact chamber and the receptacle. The door movable between a closed position and an open position. The door restricts access to the supply contact chamber in the closed position from an exterior of the supply power connector. The supply charging device includes a contact actuator coupled to the supply contact holder. The contact actuator moves the supply contact holder between a retracted position and an advanced position. The supply contact holder holds the supply power contacts in the supply contact chamber rearward of the door in the retracted position. The supply contact holder holds the supply power contacts in the receptacle forward of the door in the advanced position for mating with the receive power connector. The supply charging device includes a float element coupled to the supply housing. The float element configured to engage the panel to allow the supply power connector to float relative to the panel for aligning the mating end of the supply power connector with the receive power connector. The supply charging device includes a sealing boot coupled to the supply housing and configured to be sealed to the panel to provide an environmental seal between the supply power connector and the panel. The sealing boot is flexible to maintain sealing between the supply housing and the panel as the supply power connector floats relative to the panel.

In a further embodiment, a charging system is provided and includes a mobile charging device including a receive power connector has a receiving housing extending between a front and a rear. The receive power connector has a mating end at the front. The receive housing is configured to be mounted to a body of a mobile device. The receive housing includes a receive contact chamber extends between the front and the rear. The receive housing includes a receive guide member has angled guide walls. The receive power connector includes receive power contacts received in the receive contact chamber. The receive power connector includes a first door at a front of the receive contact chamber. The first door movable between a closed position and an open position. The first door restricts access to the receive contact chamber in the closed position from an exterior of the receive power connector. The charging system includes a supply charging device including a supply power connector having a supply power connector having a supply housing extends between a front and a rear. The supply housing is configured to be coupled to a panel. The supply power connector has a mating end at the front. The supply housing includes a supply contact chamber extends between the front and the rear. The supply housing includes a receptacle at the mating end that receives the mating end of the receive power connector. The supply housing includes a supply guide member at the mating end forward of the receptacle configured to engage the receptacle guide member to guide the receive power connector into the receptacle. The supply power connector includes a supply contact assembly received in the supply contact chamber. The supply contact assembly includes a supply contact holder holding supply power contacts. The supply power connector includes a second door between the supply contact chamber and the receptacle. The second door movable between a closed position and an open position. The second door restricts access to the supply contact chamber in the closed position from an exterior of the supply power connector. The supply charging device includes a float element coupled to the supply housing. The float element configured to engage the panel to allow the supply power connector to float relative to the panel for aligning the mating end of the supply power connector with the receive power connector. The supply charging device includes a sealing boot coupled to the supply housing and configured to be sealed to the panel to provide an environmental seal between the supply power connector and the panel. The sealing boot is flexible to maintain sealing between the supply housing and the panel as the supply power connector floats relative to the panel during mating with the receive power connector.

DETAILED DESCRIPTION OF THE INVENTION

Figure 1:
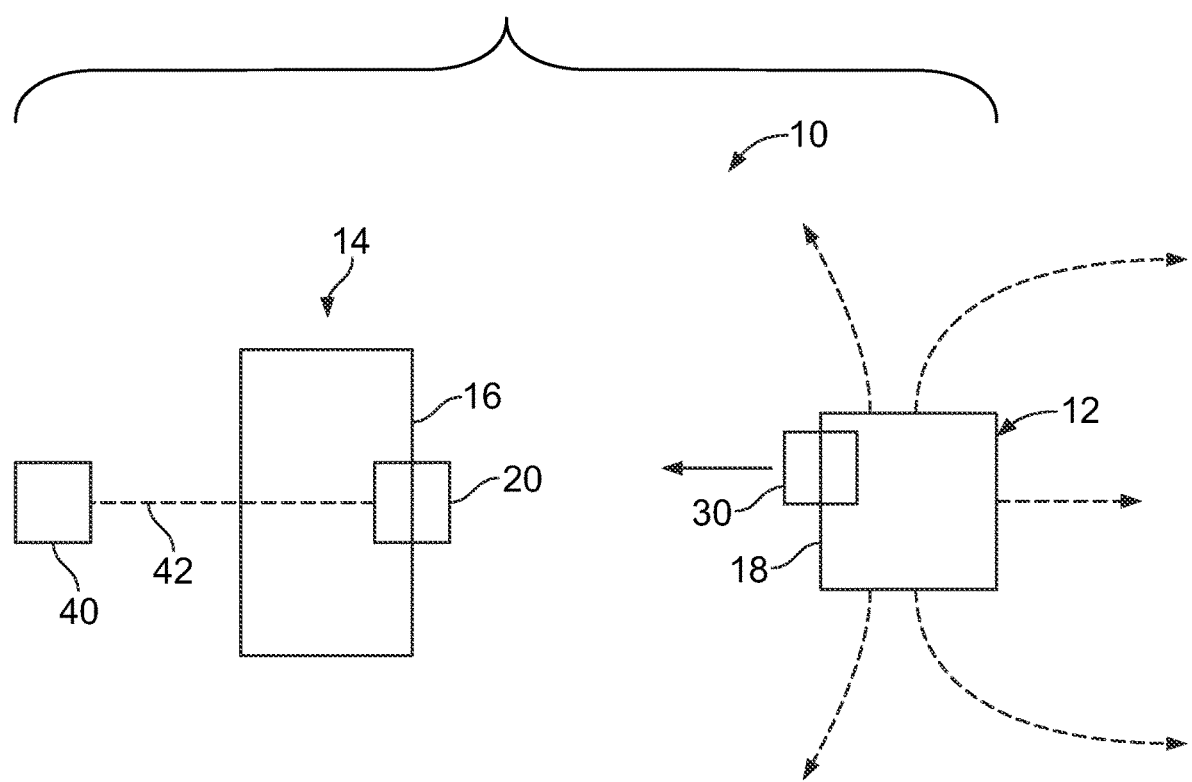
FIG. 1 illustrates a charging system for charging a mobile device in accordance with an exemplary embodiment.

FIG. 1 illustrates a charging system 10 for charging a mobile device 12 in accordance with an exemplary embodiment. The charging system 10 includes a supply charging device 20 and a mobile charging device 30. The mobile charging device 30 is provided on the mobile device 12. The supply charging device 20 is provided on a charging component 14. The charging component 14 may be a docketing station. The charging component 14 may be fixed, such as to a wall or panel 16. In other various embodiments, the charging component 14 may be a movable charging component, such as a charging station. The charging component 14 may be provided in a room or building in a fixed location and the mobile device 12 may be separated from the charging component 14 and returned to the charging component 14 to recharge the mobile device 12. The supply charging device 20 receives power from a power supply 40, such as via a power wires 42 routed between the power supply 40 and the supply charging device 20.

In an exemplary embodiment, the mobile device 12 is an autonomous mobile device that is movable within an environment to perform a task and return to the supply charging device 20 to charge the autonomous mobile device 12. For example, the mobile charging device 30 may be mated to the supply charging device 20 to recharge the mobile device 12. In various embodiments, the mobile device 12 may be a mobile robot, such as for used to perform tasks in a factory, a hotel, a store or another environment. For example, the mobile robot may be used to scan items on shelves, deliver items from one location to another location, or perform other tasks. The mobile charging device 30 is mounted to a body 18 of the mobile device 12. In various embodiments, the mobile charging device 30 may have a limited amount of floating movement relative to the body 18 to align the mobile charging device 30 relative to the supply charging device 20 during mating, such as when the mobile device 12 docks with the charging component in an offset position.

In an exemplary embodiment, the supply charging device 20 is capable of accommodating misalignment of the mobile charging device 30 when the mobile device 12 returns to the charging component 14 by moving or floating relative to the panel 16 to align the supply charging device 20 with the mobile charging device 30. The supply charging device 20 may allow floating movement relative to the panel 16 of approximately 10 mm or more.

Figure 2:
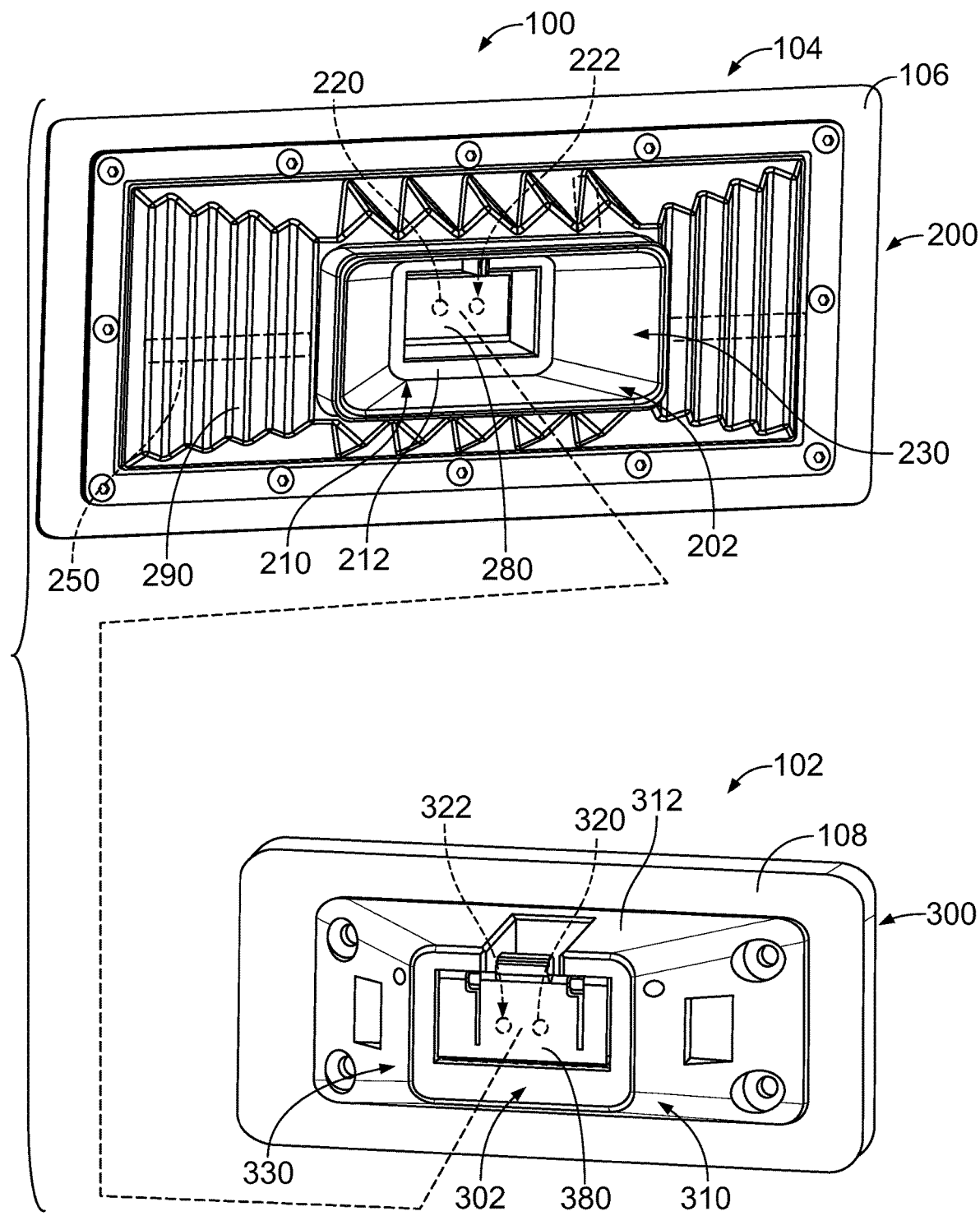
FIG. 2 illustrates a charging system for charging a mobile device in accordance with an exemplary embodiment.

FIG. 2 illustrates a charging system 100 for charging a mobile device 102 in accordance with an exemplary embodiment. The charging system 100 includes a supply charging device 200 and a mobile charging device 300. The mobile charging device 300 is provided on the mobile device 102 and includes a mating end 302 configured to be mated with the supply charging device 200. The supply charging device 200 is provided on a charging component 104 and includes a mating end 202 configured to be mated with the mobile charging device 300. The supply charging device 200 is coupled to a panel 106 of the charging component 104. The mobile charging device 300 is coupled to a body 108 of the mobile device 102. The mobile device 102 is configured to be separated from the charging component 104 and returned to the charging component 104 to recharge the mobile device 102.

The mobile charging device 300 receives power from the supply charging device 200 when coupled thereto. The mobile charging device 300 includes a receive power connector 310 having a receive housing 312. The receive housing 312 includes a guide feature 330 to guide mating of the mobile charging device 300 with the supply charging device 200. The receive power connector 310 includes a receive contact assembly 322 (shown in phantom) having a plurality of receive power contacts 320 (shown in phantom). The receive contact assembly 322 is coupled to the receive housing 312. The receive power connector 310 includes a door 380 coupled to the receive housing 312. The door 380 is used to close access to the receive contact assembly 322. The door 380 may be sealed to the receive housing 312 when closed to protect the receive power contacts 320 from moisture, dirt, debris or other contaminants. The door 380 may be a touch-safe feature preventing inadvertent touching of the receive power contacts 320.

The supply charging device 200 includes a supply power connector 210 having a supply housing 212. The supply housing 212 includes a guide member 230 configured to guide mating of the receive charging device 300 with the supply charging device 200. The supply power connector 210 includes a supply contact assembly 222 (shown in phantom) having a plurality of supply power contacts 220 (shown in phantom). The supply contact assembly 222 is coupled to the supply housing 212. In an exemplary embodiment, the supply contact assembly 222 is movably coupled to the supply housing 212, such as for mating with the receive contact assembly 322.

In an exemplary embodiment, the supply charging device 200 is capable of accommodating misalignment of the mobile charging device 300 during mating by moving or floating relative to the panel 106 to align the supply charging device 200 with the mobile charging device 300. For example, the supply charging device includes one or more float elements 250 (shown in phantom) that allow floating movement in one or more directions. The supply charging device 200 may allow floating movement relative to the panel 106 in a horizontal direction and/or a vertical direction. The supply charging device 200 may allow floating movement of approximately 10 mm or more. For example, in various embodiments, the supply charging device 200 may allow horizontal floating movement of approximately 20 mm. The supply charging device 200 may allow vertical floating movement of approximately 5 mm.

The supply power connector 210 includes a door 280 coupled to the supply housing 212. The door 280 is used to close access to the supply contact assembly 222. The door 280 may be sealed to the supply housing 212 when closed to protect the supply power contacts 220 from moisture, dirt, debris or other contaminants. The door 280 may be a touch-safe feature preventing inadvertent touching of the supply power contacts 220.

In an exemplary embodiment, the supply charging device 200 includes a sealing boot 290 coupled to the supply housing 212. The sealing boot 290 is sealed to the panel 106 to provide an environmental seal between the supply power connector 210 and the panel 106. The sealing boot 290 is flexible to maintain sealing between the supply housing 212 and the panel 106 as the supply power connector 210 floats relative to the panel 106.

Figure 3:
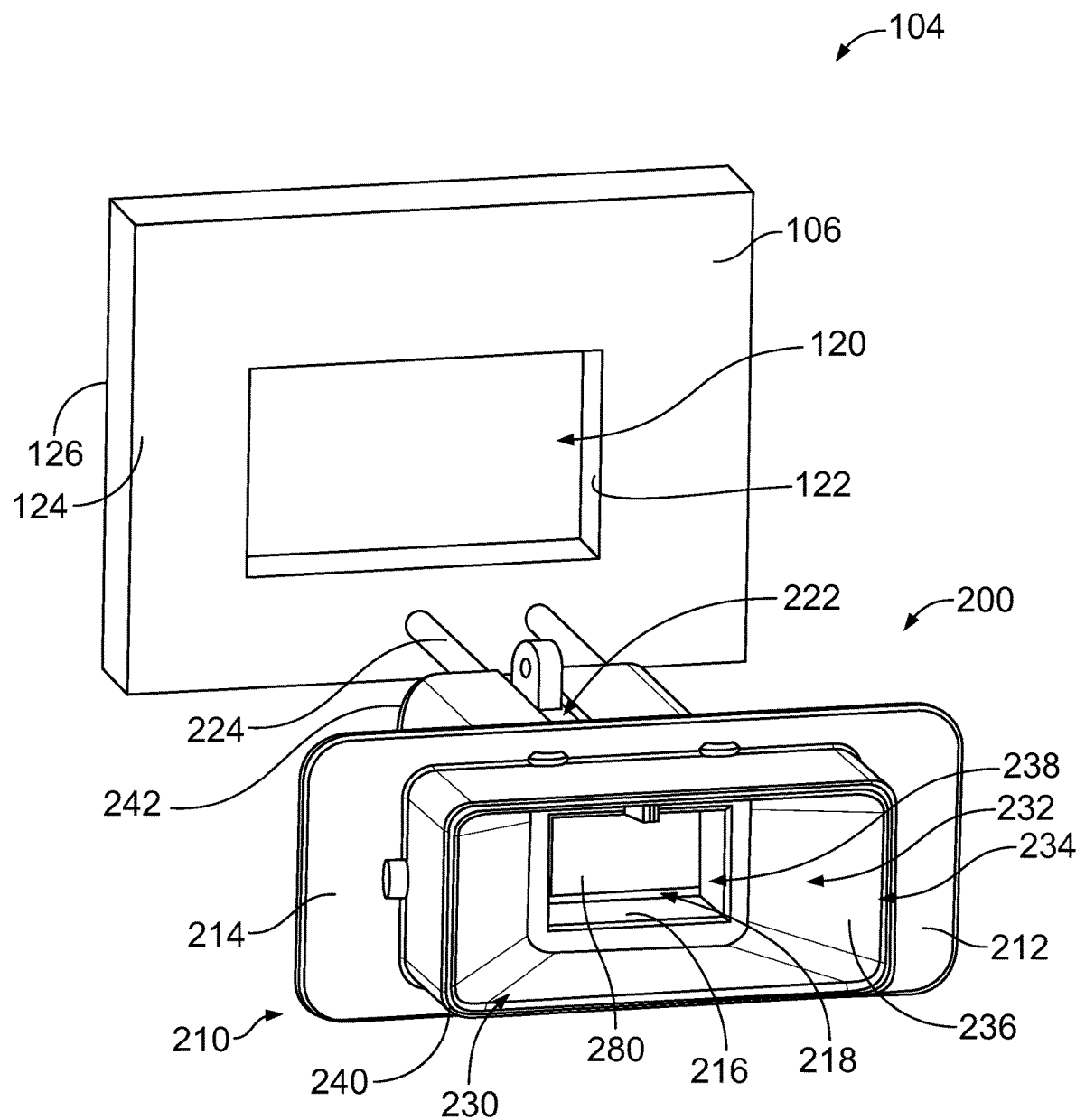
FIG. 3 is a front perspective view of a portion of the charging component showing a portion of the supply charging device configured to be mated to the panel in accordance with an exemplary embodiment.

FIG. 3 is a front perspective view of a portion of the charging component 104 showing a portion of the supply charging device 200 configured to be mated to the panel 106. The panel 106 includes a panel cutout 120 configured to receive the supply charging device 200. The panel cutout 120 is defined by edges 122 extending between a front 124 and a rear 126 of the panel 106. The front 124 faces an exterior of the charging component 104 and the rear 126 faces an interior of the charging component 104.

The supply charging device 200 includes the supply power connector 210. In FIG. 3, the float element(s) 250 and the sealing boot 290 are removed (not shown) to illustrate the supply power connector 210. The supply power connector 210 includes the supply housing 212, the supply contact assembly 222, and the door 280.

The supply housing 212 includes a supply flange 214 configured to be mounted to the panel 106, a supply base 216 extending rearward from the supply flange 214 to a rear 242 of the supply housing 212, and the guide member 330 extending forward from the supply flange 214 to a front 240 of the supply housing 212. The supply base 216 is smaller (narrower and shorter) than the panel cutout 120 such that the supply base 216 may be loaded through the panel cutout 120. The supply housing 212 is able to float in the panel cutout 120 because the supply base 216 is smaller than the panel cutout 120 and is able to move (for example, horizontally and/or vertically in the panel cutout 120). The supply flange 214 is sized larger than the panel cutout 120. The supply flange 214 is configured to be coupled to the front 124 of the panel 106. The supply flange 214 slides along the panel 106 as the supply charging device 200 floats within the panel cutout 120.

A supply contact chamber 218 extends through the supply housing 212 between the front 240 and the rear 242. The supply contact chamber 218 extends through the supply base 216. The supply contact chamber 218 receives the supply contact assembly 222. In an exemplary embodiment, supply power cables 224 are coupled to corresponding supply power contacts 220 and extend from the rear 242 of the supply housing 212.

The guide member 230 is located at the front 240 of the supply housing 212. In an exemplary embodiment, the guide member 230 includes a funnel 232 having an opening 234 at the front 240. The funnel 232 has angled guide walls 236 between the opening 234 and a receptacle 238 at the supply base 216. The door 280 is located at the receptacle 238, such as to restrict access to the supply contact chamber 218. In the illustrated embodiment, the guide walls 236 are provided on all four sides of the funnel 232 to guide mating from above, from below, from a first side and from a second side (for example, providing X and Y guidance). The guide walls 236 guide alignment and mating of the receive charging device 300 (FIG. 2) with the supply charging device 200.

Figure 4:
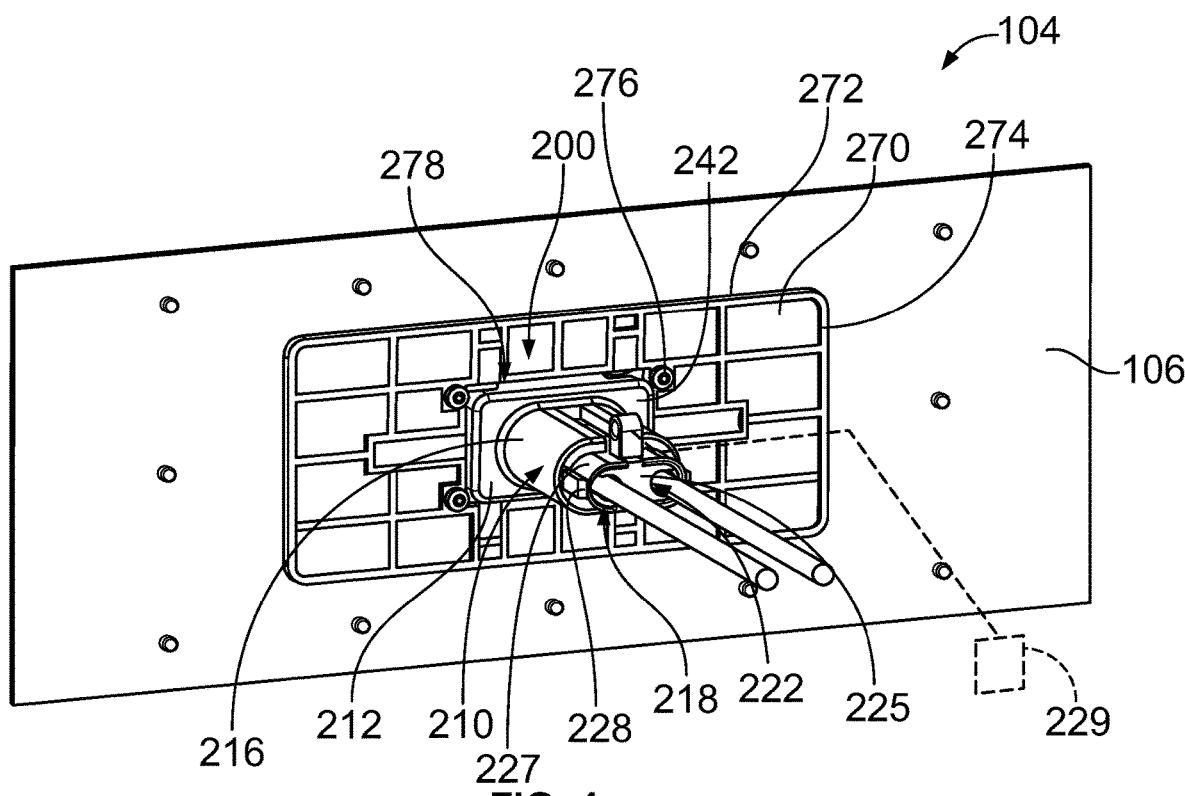
FIG. 4 is a rear perspective view of a portion of the charging component showing the supply charging device coupled to the panel in accordance with an exemplary embodiment.
Figure 5:
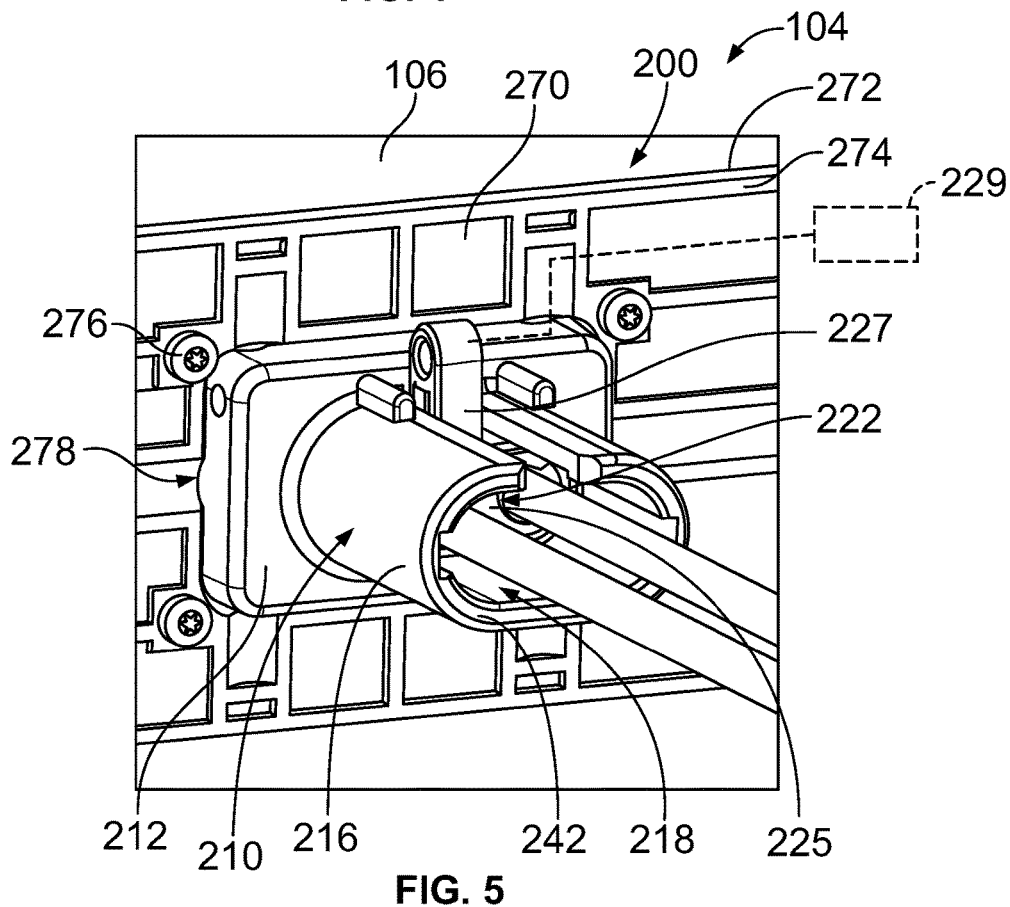
FIG. 5 is a rear perspective view of a portion of the charging component showing the supply charging device coupled to the panel in accordance with an exemplary embodiment.
Figure 6:
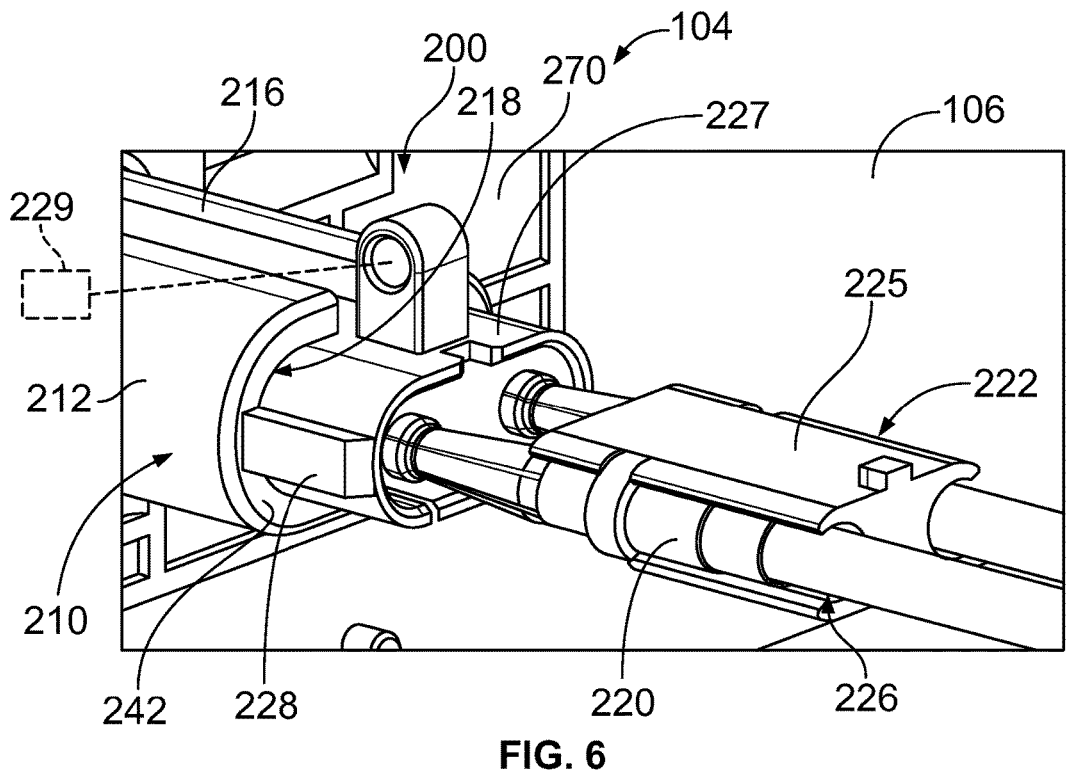
FIG. 6 is an exploded, rear perspective view of a portion of the supply charging device in accordance with an exemplary embodiment.

FIG. 4 is a rear perspective view of a portion of the charging component 104 showing the supply charging device 200 coupled to the panel 106 in accordance with an exemplary embodiment. FIG. 5 is a rear perspective view of a portion of the charging component 104 showing the supply charging device 200 coupled to the panel 106 in accordance with an exemplary embodiment. FIG. 6 is an exploded, rear perspective view of a portion of the supply charging device 200 in accordance with an exemplary embodiment. FIG. 4 shows the supply contact assembly 222 in a retracted position and FIG. 5 shows the supply contact assembly 222 in an advanced position.

In an exemplary embodiment, the supply charging device 200 includes a retaining plate 270 coupled to the rear 242 of the supply housing 212. The retaining plate 270 is used to mount the supply power connector 210 to the panel 106. The retaining plate 270 includes a front 272 and a rear 274. The front 272 faces the panel 106. Fasteners 276 are used to secure the retaining plate 270 to the supply housing 212, such as to the supply flange 214 (shown in FIG. 3). The panel 106 is captured in a gap between the front 272 of the retaining plate 270 and the rear 242 of the supply flange 214. The retaining plate 270 includes an opening 278 configured to receive the supply base 216.

The supply base 216 extends into and through the panel cutout 120 and the opening 278 to the interior of the charging component 104. The supply contact assembly 222 is received in the supply contact chamber 218 in the supply base 216. In an exemplary embodiment, the supply contact assembly 222 is movable within the supply contact chamber 218, such as to move the supply power contacts 220 into and out or the supply contact chamber 218 for mating with the receive charging device 300 (shown in FIG. 2).

The supply contact assembly 222 includes a supply contact holder 225 that holds the supply power contacts 220. The supply power contacts 220 are received in contact channels 226 in the supply contact holder 225. In the illustrated embodiment, the contact channels 226 are located at the sides of the supply contact holder 225. The supply contact holder 225 may include greater or fewer than two contact channels 226 in alternative embodiments. In the illustrated embodiment, the supply power contacts 220 are socket contacts having sockets at the mating ends of the supply power contacts 220. Other types of contacts may be used in alternative embodiments, such as pin contacts, blade contacts, or other types of contacts.

In an exemplary embodiment, the supply contact assembly includes a slide 227 that receives the supply contact holder 225. The slide 227 is received in the supply contact chamber 218. The slide 227 is slidable within the supply contact chamber 218 of the supply base 216. In various embodiments, the slide 227 includes rails 228 along the sides to guide the sliding movement of the slide 227 within the supply contact chamber 218. In an exemplary embodiment, an actuator 229 is configured to be coupled to the slide 227 to move the slide 227 in the supply contact chamber 218. The actuator 229 may be coupled to a mount or other structure of the slide 227. The actuator 229 may be a linear actuator, such as an electric actuator that moves the slide 227, and thus the supply contact holder 225 and supply power contacts 220 in a linear actuation direction. The actuator 229 moves the supply contact holder 225 and supply power contacts 220 between a retracted position (FIG. 4) and an advanced position (FIG. 5). The supply contact holder 225 and supply power contacts 220 are moved to the advanced position during mating to mate with the receive charging device 300. In an exemplary embodiment, the actuator 229 moves the supply contact holder 225 and supply power contacts 220 to the advanced position after the receive charging device 300 is mated with the supply charging device 200. Optionally, the actuator 229 is operated to open the door 280. For example, as the supply contact holder 225 and supply power contacts 220 is moved to the advanced position, the supply contact holder 225 and/or supply power contacts 220 pushes against the door 280 to open the door 280.

Figure 7:
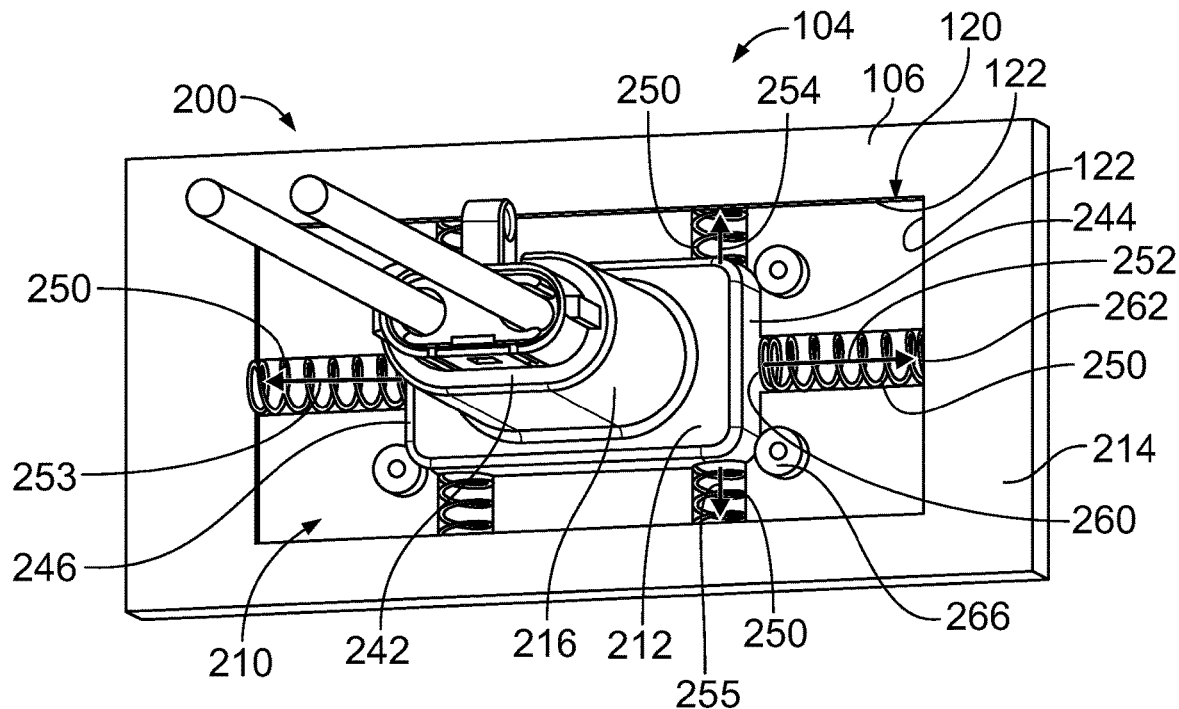
FIG. 7 is a rear perspective view of the charging component showing a portion of the supply charging device mated to the panel in accordance with an exemplary embodiment.

FIG. 7 is a rear perspective view of the charging component 104 showing a portion of the supply charging device 200 mated to the panel 106. The supply flange 214 is located forward of the panel 106. The supply base 216 extends into and through the panel cutout 120 to the interior of the charging component 104.

In an exemplary embodiment, the supply charging device 200 includes float elements 250 coupled to the supply housing 212 at the rear 242 of the supply housing 212. The float elements 250 are compressible and/or extendable. In various embodiments, the float elements 250 may be springs, such as coil springs. The float elements 250 are configured to engage the panel 106 to allow the supply power connector 210 to float relative to the panel 106 for alignment of the mating end 202 of the supply power connector 210 with the receive power connector 310 (shown in FIG. 2). The float elements 250 are compressible to allow the supply housing 212 to move relative to the panel 106 to change a position of the mating end 202 of the supply power connector 210 relative to the panel 106 for mating with the receive power connector 310. In the illustrated embodiment, the float elements 250 are located at a first side 244 of the base 216 and/or a second side 246 and/or above the base 216 and/or below the base 216. Other locations are possible in alternative embodiments. Each float element 250 includes a first end 260 coupled to the supply housing 212 and a second end 262 coupled to the panel 106. The float element 250 is compressible such that the second end 262 is movable relative to the first end 260, such as in a direction toward the first end 260.

In an exemplary embodiment, the supply housing 212 includes locating features 266 extending from the supply flange 214 at the rear 242. In the illustrated embodiment, the locating features 266 are cylindrical posts. Other types of locating features may be used in alternative embodiments. The locating features 266 may be provided on the supply base 216 in alternative embodiments. The locating features 266 are received in the panel cutout 120 and are used to locate the supply power connector 210 relative to the panel 106. For example, the locating features 266 may engage the edges 122 to control or limit floating movement of the supply power connector 210 relative to the panel 106. The locating features 266 may limit over deflection of the float elements 250.

The float elements 250 bias the supply power connector 210 to a resting position (FIG. 7) relative to the panel 106. For example, the supply base 216 may be approximately centered within the panel cutout 120 in the resting position. The supply power connector 210 is movable from the resting position to an offset position (for example, movable to the right side, to the left side, upward, and/or downward), such as when the mobile charging device 300 (shown in FIG. 2) engages the supply charging device 200 to align the supply charging device 200 with the mobile charging device 300. The float elements 250 may be compressed or extended when the supply power connector 210 moves to the offset position. The float elements 250 return the supply power connector 210 from the offset position to the resting position when the supply power connector 210 is released.

In an exemplary embodiment, the supply power connector 210 is movable horizontally (side-to-side) and vertically (up-and-down) within the panel cutout 120. The supply power connector 210 may be moved horizontally in a first horizontal direction 252 or a second horizontal direction 253 and/or may be moved vertically in a first vertical direction 254 or a second vertical direction 255. The first and second horizontal directions 252, 254 are parallel to each other in opposing directions. The first and second vertical directions 253, 253 are parallel to each other in opposing directions. The first and second horizontal directions 252, 254 are perpendicular to the first and second vertical directions 253, 255. The width and height of the panel cutout 120, as well as the positioning of the locating features 266, control the horizontal positioning and the vertical positioning of the supply charging device 200 relative to the panel 106.

Figure 8:
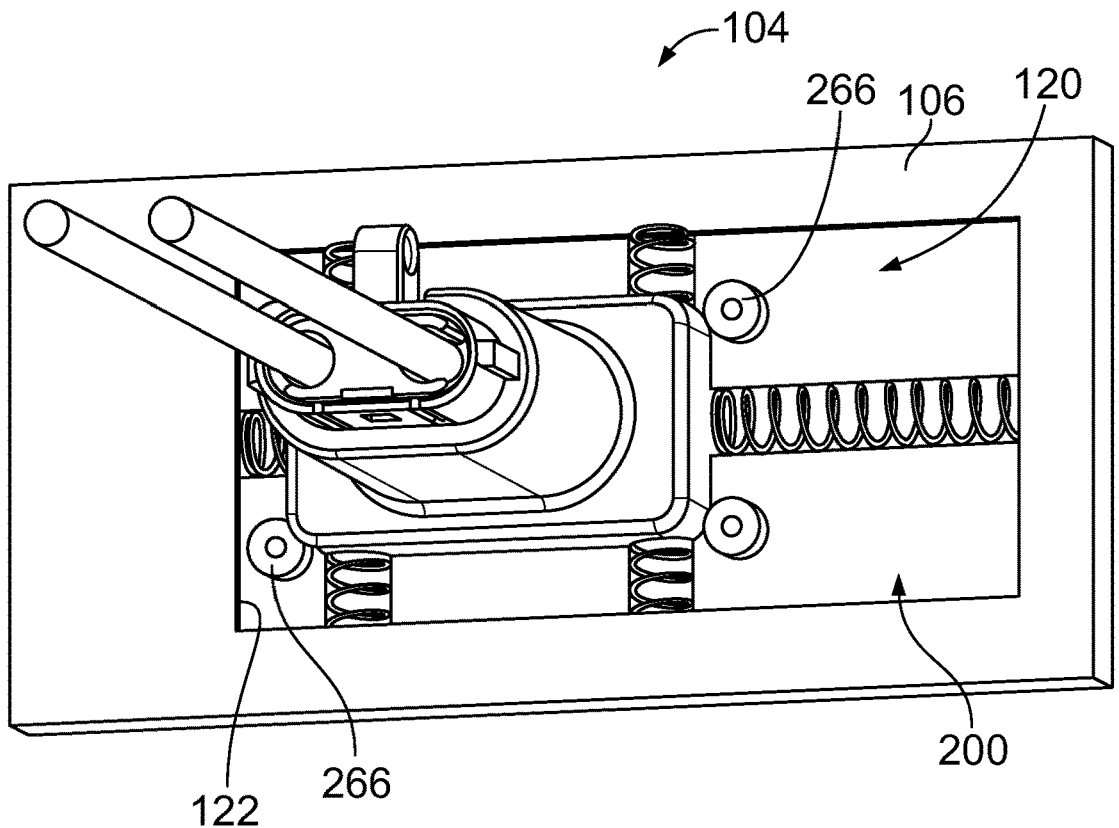
FIG. 8 is a rear perspective view of the charging component showing the supply charging device horizontally offset in the first horizontal direction in accordance with an exemplary embodiment.

FIG. 8 is a rear perspective view of the charging component 104 showing the supply charging device 200 horizontally offset in the first horizontal direction. In the illustrated embodiment, the locating features 266 engage the edge 122 of the panel opening 120 to limit the offset of the supply charging device 200 relative to the panel 106.

Figure 9:
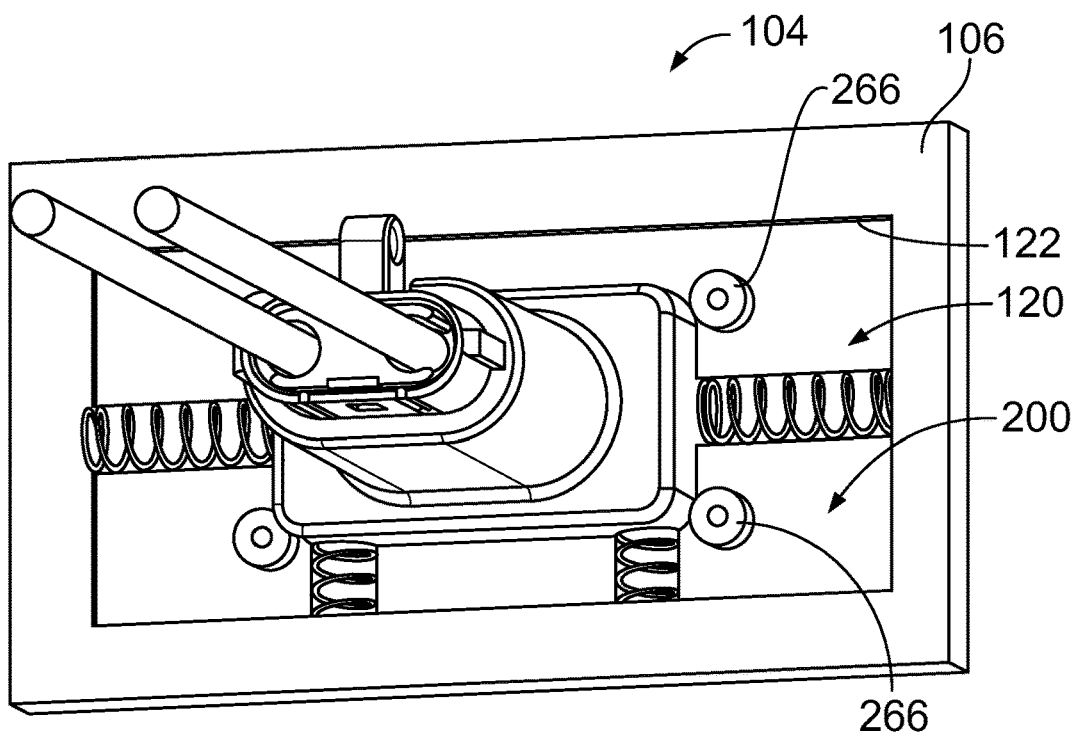
FIG. 9 is a rear perspective view of the charging component showing the supply charging device vertically offset in the first vertical direction in accordance with an exemplary embodiment.

FIG. 9 is a rear perspective view of the charging component 104 showing the supply charging device 200 vertically offset in the first vertical direction. In the illustrated embodiment, the locating features 266 engage the edge 122 of the panel opening 120 to limit the offset of the supply charging device 200 relative to the panel 106.

Figure 10:
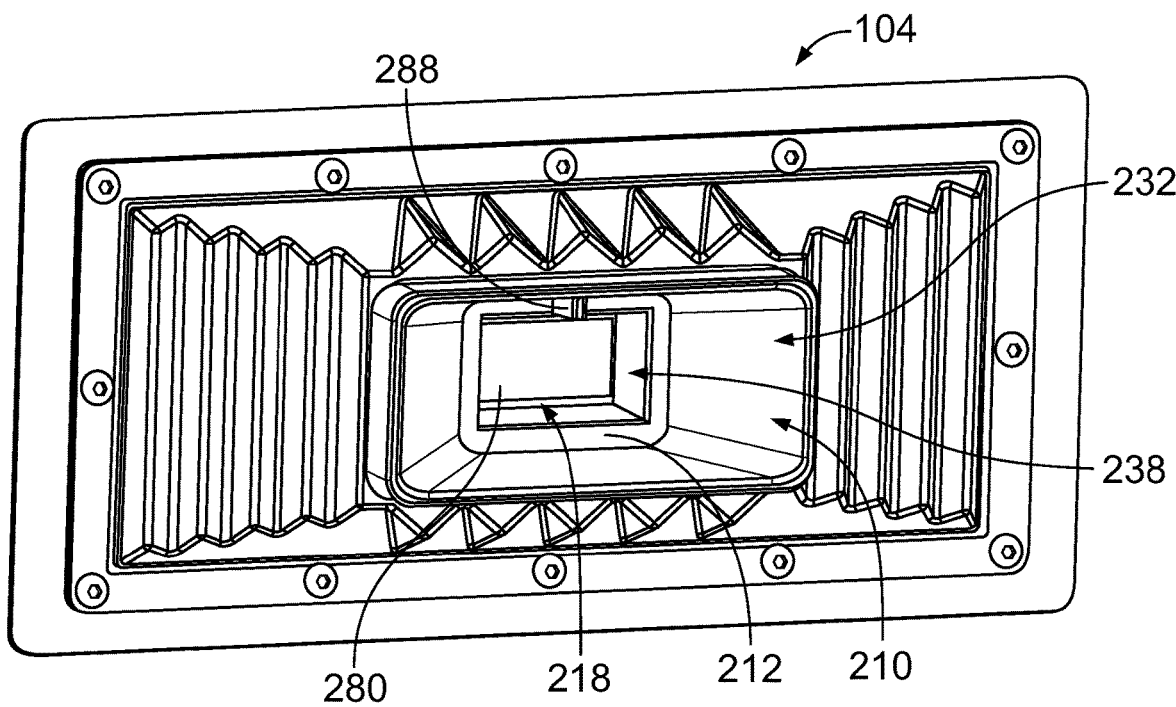
FIG. 10 is a front perspective view of a portion of the charging component showing the door of the supply power connector in a closed position in accordance with an exemplary embodiment.
Figure 11:
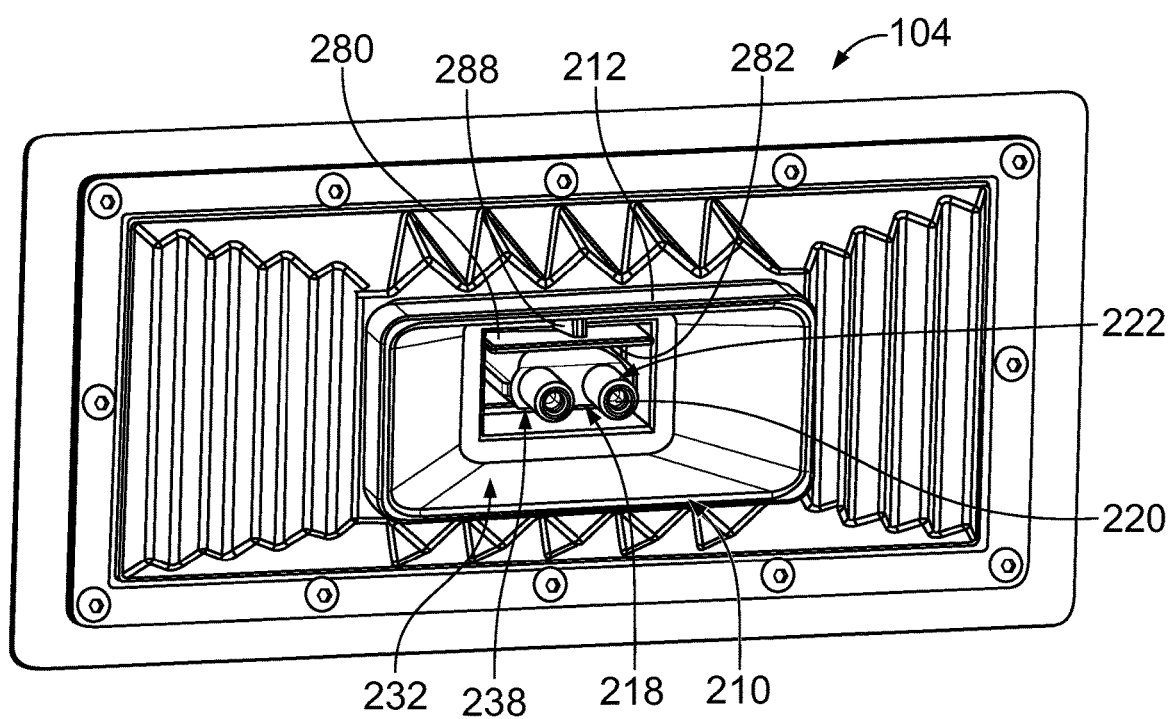
FIG. 11 is a front perspective view of a portion of the charging component showing the door of the supply power connector in an open position in accordance with an exemplary embodiment.

FIG. 10 is a front perspective view of a portion of the charging component 104 showing the door 280 of the supply power connector 210 in a closed position. FIG. 11 is a front perspective view of a portion of the charging component 104 showing the door 280 of the supply power connector 210 in an open position. FIG. 11 shows the supply contact assembly 222 in an advanced position.

The door 280 is located in the receptacle 238 and/or the supply contact chamber 218, such as the interface between the receptacle 238 and the supply contact chamber 218. The door 280 blocks access to the supply contact chamber 218 when the door 280 is closed. The supply contact assembly 222 is hidden behind the door 280 when the door 280 is closed. In an exemplary embodiment, a seal 282 is provided to seal between the door 280 and the supply housing 212. The seal 282 may be coupled to the door 280. In other embodiments, the seal 282 may be coupled to the supply housing 212. When the door 280 is open, the supply power contacts 220 are accessible, such as for mating with the receive power connector 310 (FIG. 2). In an exemplary embodiment, the supply contact assembly 222 and the supply power contacts 220 may be movable, such as from the retracted position to the advanced position (FIG. 11), after the door 280 is open for mating with the receive power connector 310. In various embodiments, the supply contact assembly 222 is advanced to open the door 280. For example, the supply contact assembly 222 pushes the door 280 open from behind the door 280.

In an exemplary embodiment, the door 280 is hingedly coupled to the supply housing 212, such as at a top of the door 280. In alternative embodiments, the door 280 may be a sliding door that may be opened by sliding in a sliding direction, such as upward or sideways. The door 280 may be a roll-up door in other various embodiments. In various embodiments, the door 280 is spring loaded, such as to automatically close when the supply contact assembly 222 is returned to the retracted position.

In an exemplary embodiment, the supply housing 212 includes a door opener 288 in the receptacle 238 or the funnel 232. The door opener 288 is used to open the door 380 (FIG. 2) of the receive power connector 310. The door opener 288 is a tab or protrusion in the illustrated embodiment. The door opener 288 operates as a pusher used to push the door 380 open when the receive power connector 310 is coupled to the supply power connector 210.

Figure 12:
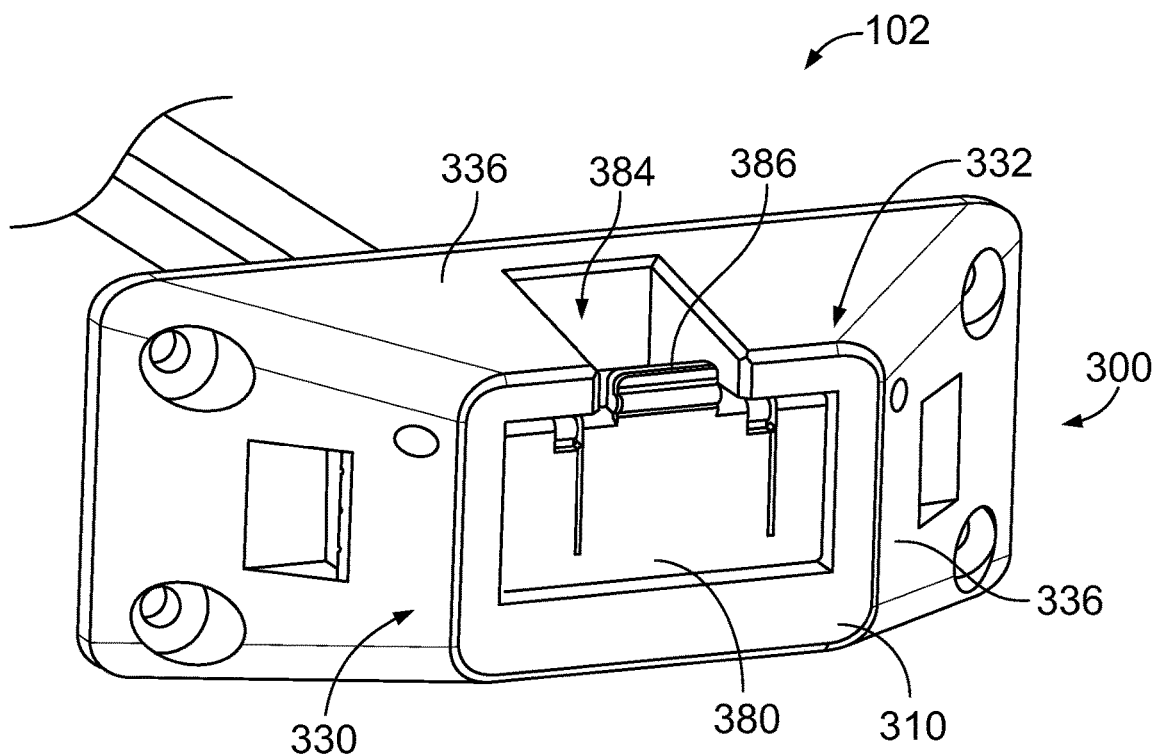
FIG. 12 is a front perspective view of the receive power connector showing the door in a closed position in accordance with an exemplary embodiment.
Figure 13:
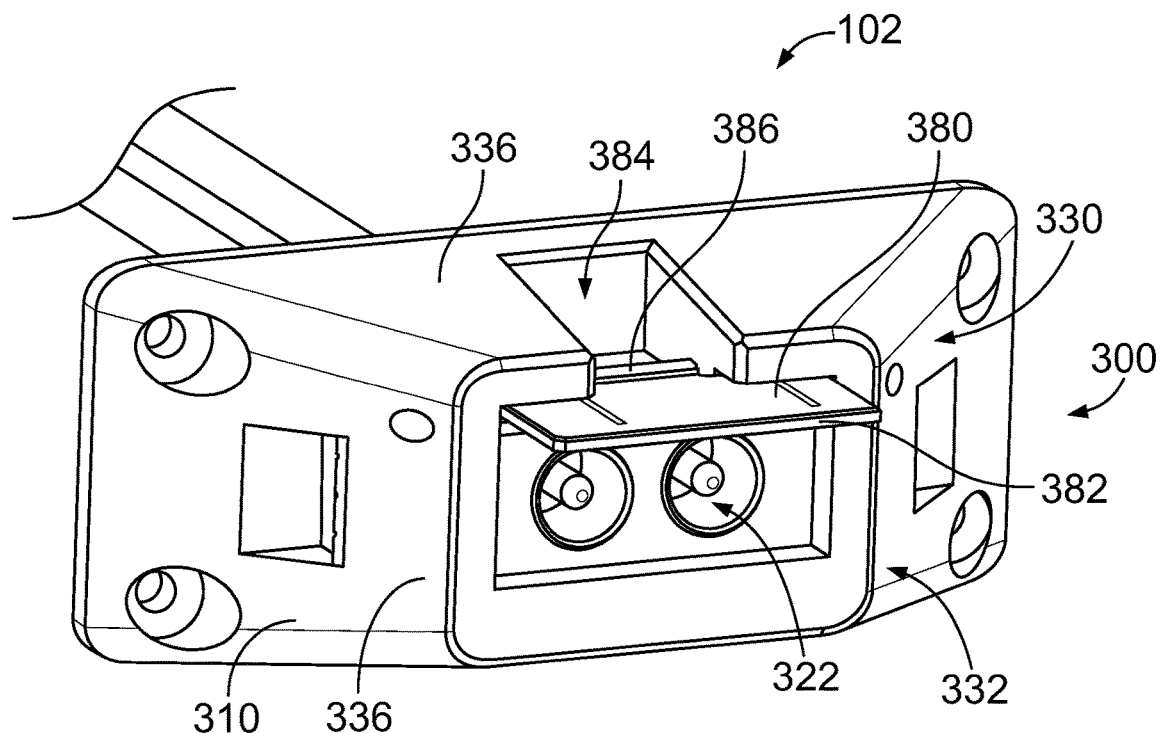
FIG. 13 is a front perspective view of the receive power connector showing the door in an open position in accordance with an exemplary embodiment.

FIG. 12 is a front perspective view of the receive power connector 310 showing the door 380 in a closed position. FIG. 13 is a front perspective view of the receive power connector 310 showing the door 380 in an open position. The receive housing 312 includes a receive base 316 and a receive flange 314 extending from the receive base 316. The receive flange 314 is configured to be mounted to the body 108 of the mobile device 102 (FIG. 2). The receive base 316 includes a receive contact chamber 318 that holds a receive contact assembly 322. The receive contact assembly 322 includes receive power contacts 320. In the illustrated embodiment, the receive power contacts 320 are illustrated as pin contacts; however, other types of power contacts may be used in alternative embodiments.

The guide member 330 of the receive housing 312 is located at a front of the receive housing 312. The guide member 330 is used to guide mating of the mobile charging device 300 with the supply charging device 200. In an exemplary embodiment, the guide member 330 includes a nose cone 332 configured to be received in the funnel 232 (FIG. 3). The nose cone 332 may have a complementary shape to the funnel 232. The nose cone 332 engages the funnel 232 to position the guide member 330 in the guide member 230. The nose cone 332 has angled guide walls 336. In the illustrated embodiment, the guide walls 336 are provided on all four sides of the nose cone 332 to guide mating from above, from below, from a first side and from a second side (for example, providing X and Y guidance). The guide walls 336 guide alignment of the supply charging device 200 and the mobile charging device 300 with the mobile device 102 returns to the charging component 104.

The door 380 is located in a pocket 384 at a front of the receive housing 312, such as at the front of the guide member 330. The door 380 blocks access to the receive contact chamber 318 when the door 380 is closed. The receive contact assembly 322 is hidden behind the door 380 when the door 380 is closed. In an exemplary embodiment, a seal 382 is provided to seal between the door 380 and the receive housing 312. The seal 382 may be coupled to the door 380. In other embodiments, the seal 382 may be coupled to the receive housing 312. When the door 380 is open, the receive power contacts 320 are accessible, such as for mating with the receive power connector 310. In an exemplary embodiment, the receive contact assembly 322 and the receive power contacts 320 are fixed relative to the receive housing 312. However, in alternative embodiments, the receive contact assembly 322 and the receive power contacts 320 may be movable, such as from a retracted position to an advanced position, similar to the supply contact assembly 222 (FIG. 11).

In an exemplary embodiment, the door 380 is hingedly coupled to the receive housing 312, such as at a top of the door 380. The door 380 may be a sliding door that may be opened by sliding in a sliding direction, such as upward or sideways. The door 380 may be a roll-up door in other various embodiments. In various embodiments, the door 380 is spring loaded, such as to automatically close when the receive power connector 310 is unmated from the supply power connector 210.

In an exemplary embodiment, the door 380 includes a handle 386 for opening the door 380. The handle 386 may be a tab or panel located above the pivot axis. The handle 386 is configured to be engaged by the door opener 288 (FIG. 10) during mating. The handle 386 is pushed inward to rotate and open the door 380. Other types of opening mechanisms may be used in alternative embodiments to open the door 380.

Figure 14:
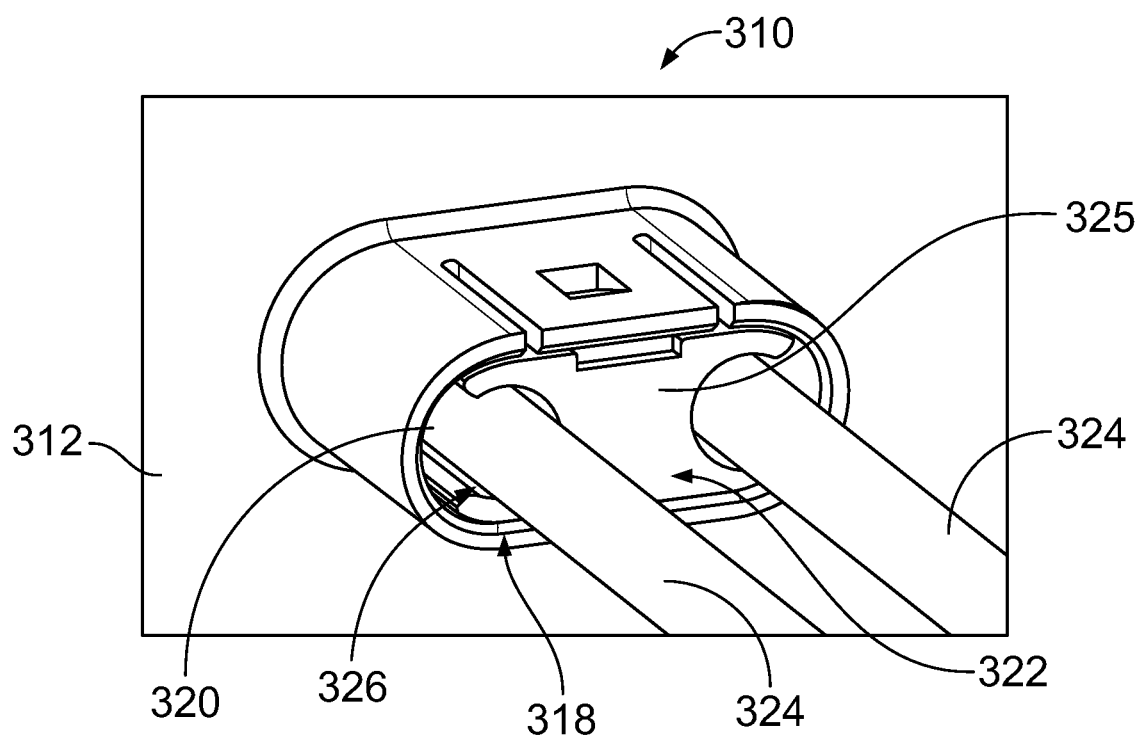
FIG. 14 is a rear perspective view of a portion of the receive power connector showing the receive contact assembly in accordance with an exemplary embodiment.

FIG. 14 is a rear perspective view of a portion of the receive power connector 310 showing the receive contact assembly 322. In an exemplary embodiment, receive power cables 324 are coupled to corresponding receive power contacts 320 and extend from a rear of the receive housing 312. The receive contact assembly 322 includes a receive contact holder 325 that holds the receive power contacts 320. The receive power contacts 320 are received in contact channels 326 in the receive contact holder 325. In the illustrated embodiment, the contact channels 326 are located at the sides of the receive contact holder 325. The receive contact holder 325 may include greater or fewer than two contact channels 326 in alternative embodiments. The receive contact holder 325 may be rear loaded into the receive contact chamber 318. The receive contact holder 325 may be removable and replaceable, such as to remove and replace the receive power contacts 320.

Figure 15:
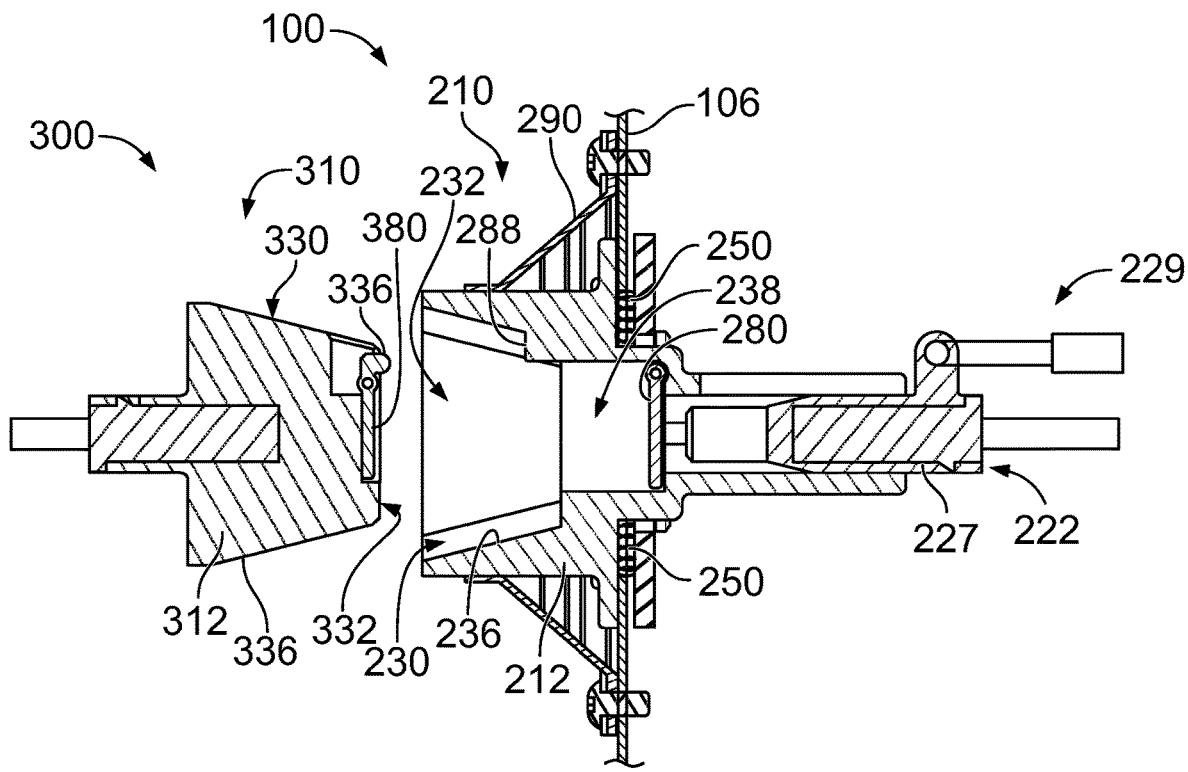
FIG. 15 is a cross sectional view of the charging system showing the receive power connector poised for mating with the supply power connector.
Figure 16:
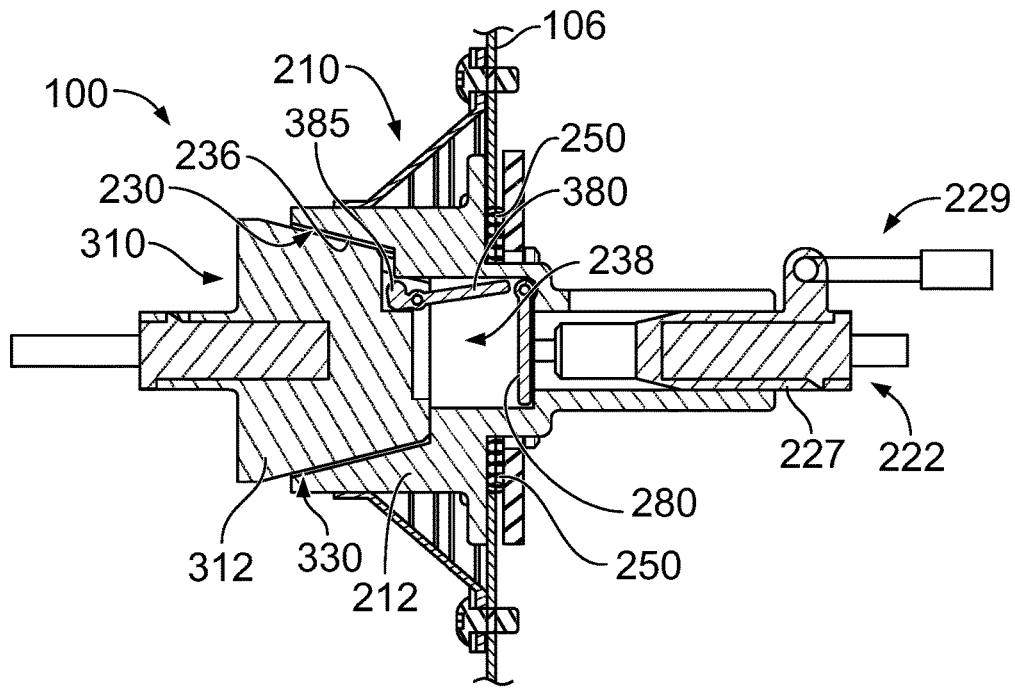
FIG. 16 is a cross sectional view of the charging system showing the receive power connector mated with the supply power connector with the supply contact assembly in a retracted position.
Figure 17:
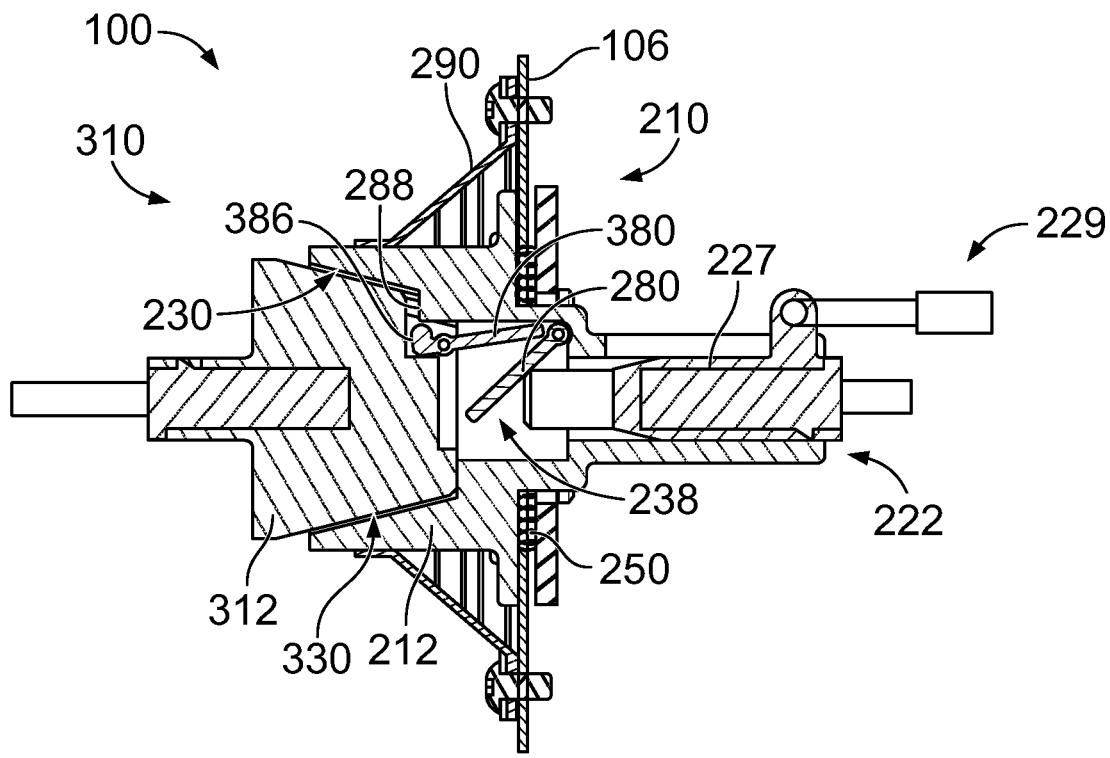
FIG. 17 is a cross sectional view of the charging system showing the receive power connector mated with the supply power connector with the supply contact assembly in partially advanced position.
Figure 18:
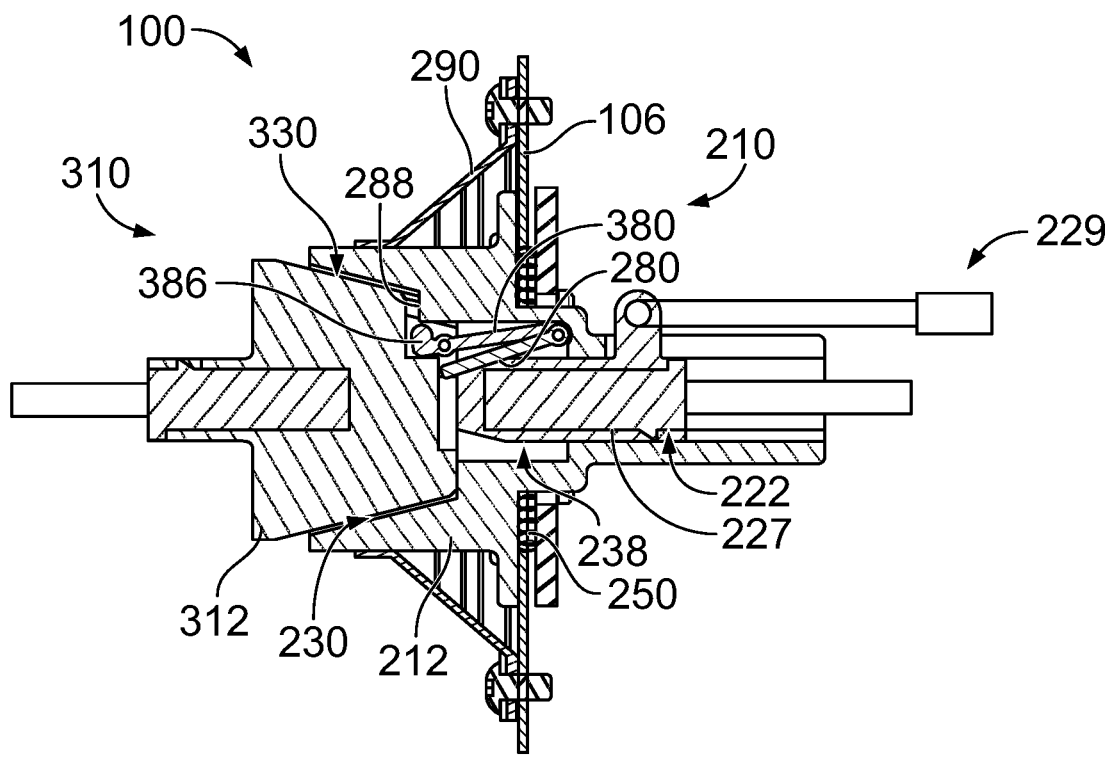
FIG. 18 is a cross sectional view of the charging system showing the receive power connector mated with the supply power connector with the supply contact assembly in an advanced position.
Figure 19:
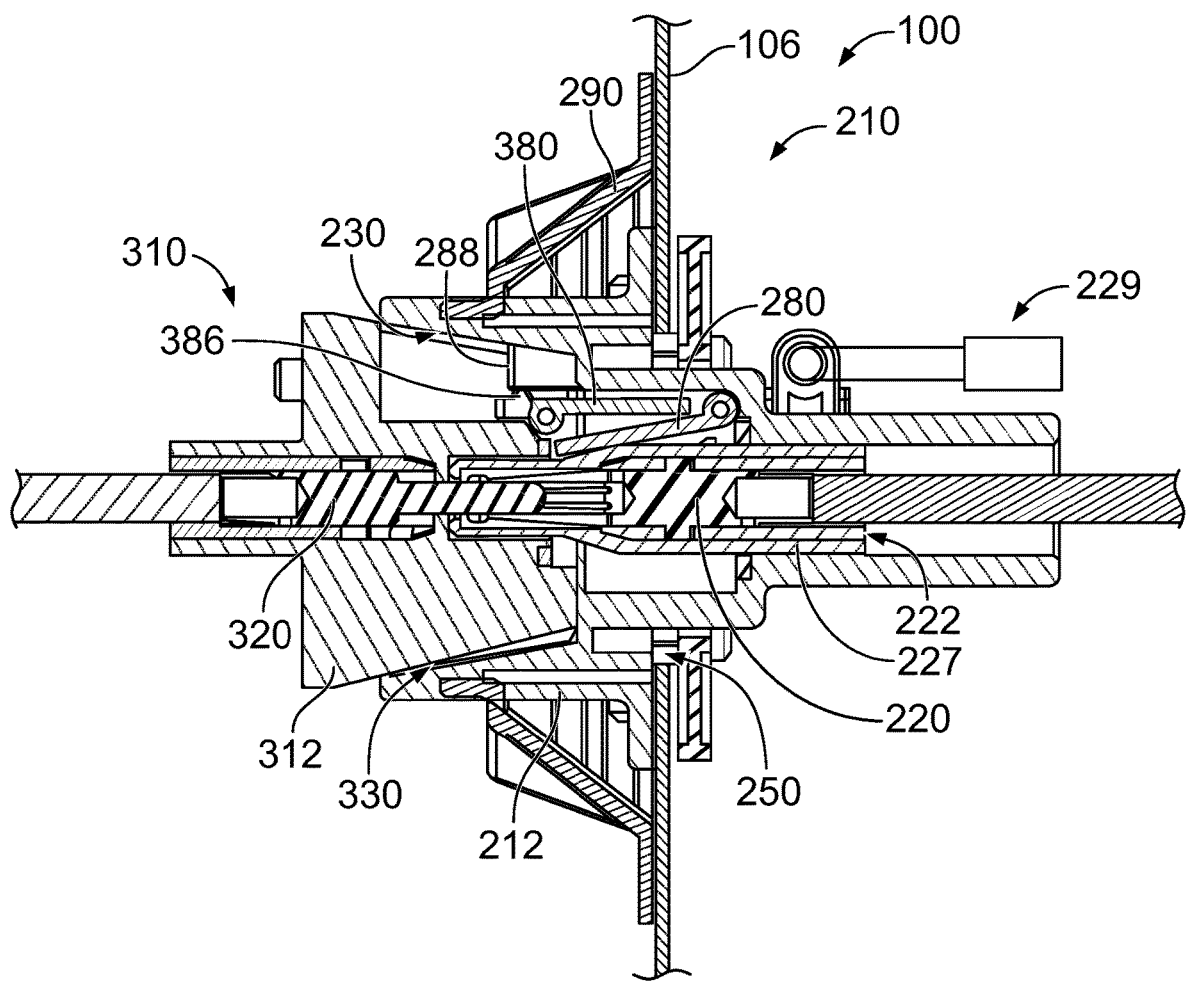
FIG. 19 is a cross sectional view of the charging system showing the receive power contacts mated with the supply power contacts.

FIGS. 15-19 illustrate a mating sequence of the receive power connector 310 with the supply power connector 210. FIG. 15 is a cross sectional view of the charging system 100 showing the receive power connector 310 poised for mating with the supply power connector 210. FIG. 16 is a cross sectional view of the charging system 100 showing the receive power connector 310 mated with the supply power connector 210 with the supply contact assembly 222 in a retracted position. FIG. 17 is a cross sectional view of the charging system 100 showing the receive power connector 310 mated with the supply power connector 210 with the supply contact assembly 222 in partially advanced position. FIG. 18 is a cross sectional view of the charging system 100 showing the receive power connector 310 mated with the supply power connector 210 with the supply contact assembly 222 in an advanced position. FIG. 19 is a cross sectional view of the charging system 100 showing the receive power connector 310 mated with the supply power connector 210 with the supply contact assembly 222 in an advanced position.

Prior to mating, both doors 280, 380 are closed. The doors 280, 380 may be sealed to the housings 212, 312. The sealing boot 290 is coupled to the supply housing 212 and sealed to the panel 106 to provide an environmental seal between the supply power connector 210 and the panel 106. The sealing boot 290 is flexible to maintain sealing between the supply housing 212 and the panel 106 as the supply power connector 210 floats relative to the panel 106.

During mating, the guide member 330 is aligned with the guide member 230. For example, the nose cone 332 is aligned with and received in the funnel 232. The angled guide walls 336 of the nose cone 332 engages the angled guide walls 236 of the funnel 232 to position the guide member 330 in the guide member 230. If the guide member 330 is offset relative to the guide member 230, the supply power connector 210 floats (for example, vertically and/or horizontally) to align with the receive power connector 310.

The float elements 250 are compressible to accommodate movement of the supply power connector 210.

When initially mated (FIG. 16), the door 380 is opened. For example, the handle 386 engages the door opener 288. As the receive power connector 310 is plugged into the receptacle 238, the door opener 288 pushes the handle 386 to pivot the door 380 to the open position. In an exemplary embodiment, the door 280 is movable independent of the door 380. For example, the door 280 may remain closed even when the door 380 is open. Optionally, the door 280 may remain closed unless and until charging of the mobile charging device 300 is desired or demanded. For example, the power contacts 220, 320 (FIG. 19) are not necessarily mated each time the connectors 210, 310 are mated. Only when charging is needed do the power contacts 220, 320 mate.

During use, the supply contact assembly 222 is moved from the retracted position (FIG. 16) to the advanced position (FIG. 18) to mate the supply power contacts 220 with the receive power contacts 320. The actuator 229 is operated to advance the supply contact assembly 222. As the supply contact assembly 222 moves forward, the slide 227 engages the door 280 (FIG. 17) to open the door 280. In the illustrated embodiment, the door 280 is pivoted open. The door 280 is pivoted into the receptacle 238. When the door is open, the supply contact assembly 222 may be moved into the receptacle 238 to mate the supply power contacts 220 with the receive power contacts 320. After charging, the actuator 229 retracts the supply contact assembly 222. The door 280 may be closed, such as using a return spring. As the receive power connector 310 is unmated, the handle 386 is released from the door opener 288 and a return spring closes the door 380. The doors 280, 380 are then sealed to the housings 212, 312 to protect the power contacts 220, 320.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A supply charging device for a mobile device, the supply charging device comprising:
   a supply power connector having a supply housing extending between a front and a rear, the supply housing configured to be coupled to a panel, the supply power connector having a mating end at the front, the supply housing including a supply contact chamber extending between the front and the rear, the supply housing including a receptacle at the mating end configured to accept a receive power connector of the mobile device, the supply housing including a guide member at the mating end forward of the receptacle configured to engage a guide feature of the receive power connector to guide the receive power connector of the mobile device into the receptacle, the supply power connector including supply power contacts in the supply contact chamber, the supply power connector including a door between the supply contact chamber and the receptacle, the door movable between a closed position and an open position, the door restricting access to the supply contact chamber in the closed position from an exterior of the supply power connector;

a float element coupled to the supply housing, the float element configured to engage the panel to allow the supply power connector to float relative to the panel for aligning the mating end of the supply power connector with the receive power connector; and a sealing boot coupled to the supply housing and configured to be sealed to the panel to provide an environmental seal between the supply power connector and the panel, the sealing boot being flexible to maintain sealing between the supply housing and the panel as the supply power connector floats relative to the panel.

2. The supply charging device of claim 1, wherein the sealing boot includes baffles allowing movement in at least one direction.

3. The supply charging device of claim 1, wherein the supply power connector includes a seal between the door and the supply housing to seal between the door in the supply housing when the door is in the closed position.

4. The supply charging device of claim 1, wherein the supply power connector includes a door opener engaging the door to move the door from the closed position to the open position.

5. The supply charging device of claim 1, wherein the guide member includes a funnel guiding the guide feature of the receive power connector into the receptacle.

6. The supply charging device of claim 1, further comprising a contact actuator coupled to the supply contact holder, the contact actuator moving the supply contact holder between a retracted position and an advanced position, the supply contact holder holding the supply power contacts in the supply contact chamber rearward of the door in the retracted position, the supply contact holder holding the supply power contacts in the receptacle forward of the door in the advanced position for mating with the receive power connector.

7. The supply charging device of claim 1, wherein the supply housing includes a flange configured to be mounted to a panel, the supply housing having a base extending rearward from the flange through a panel cutout in the panel, the supply charging device further comprising a retaining plate coupled to the rear of the supply housing, a panel gap being defined between the retaining plate and the rear of the supply housing with the panel received between the flange and the retaining plate.

8. The supply charging device of claim 1, wherein the supply housing includes a locating feature received in a cutout of the panel, the locating feature configured to engage the panel to control an amount of floating movement of the supply power connector relative to the panel.

9. The supply charging device of claim 1, wherein the float element biases the supply power connector to a resting position relative to the panel, the supply power connector movable from the resting position to an offset position, the float element returning the supply power connector from the offset position to the resting position when the supply power connector is released.

10. The supply charging device of claim 1, wherein the float element is a first float element, the supply charging device further comprising a second float element, the first float element biasing the supply power connector relative to the panel in a first direction, the second float element biasing the supply power connector relative to the panel in a second direction, the second direction being parallel to and opposing the first direction.

11. The supply charging device of claim 10, further comprising a third float element, the third float element biasing the supply power connector relative to the panel in a third direction, the third direction being perpendicular to the first direction and the second direction.

12. A supply charging device for a mobile device, the supply charging device comprising:

a supply power connector having a supply housing extending between a front and a rear, the supply housing configured to be coupled to a panel, the supply power connector having a mating end at the front, the supply housing including a supply contact chamber extending between the front and the rear, the supply housing including a receptacle at the mating end configured to accept a receive power connector of the mobile device, the supply housing including a guide member at the mating end forward of the receptacle configured to engage a guide feature of the mobile device to guide the receive power connector of the mobile device into the receptacle, the supply power connector including a supply contact assembly received in the supply contact chamber, the supply contact assembly including a supply contact holder holding supply power contacts, the supply contact assembly being movable relative to the supply housing, the supply power connector including a door between the supply contact chamber and the receptacle, the door movable between a closed position and an open position, the door restricting access to the supply contact chamber in the closed position from an exterior of the supply power connector;

a contact actuator coupled to the supply contact holder, the contact actuator moving the supply contact holder between a retracted position and an advanced position, the supply contact holder holding the supply power contacts in the supply contact chamber rearward of the door in the retracted position, the supply contact holder holding the supply power contacts in the receptacle forward of the door in the advanced position for mating with the receive power connector, the a float element coupled to the supply housing, the float element configured to engage the panel to allow the supply power connector to float relative to the panel for aligning the mating end of the supply power connector with the receive power connector; and a sealing boot coupled to the supply housing and configured to be sealed to the panel to provide an environmental seal between the supply power connector and the panel, the sealing boot being flexible to maintain sealing between the supply housing and the panel as the supply power connector floats relative to the panel.

13. The supply charging device of claim 12, wherein the sealing boot includes baffles allowing movement in at least one direction.

14. The supply charging device of claim 12, wherein the supply power connector includes a seal between the door and the supply housing to seal between the door in the supply housing when the door is in the closed position.

15. The supply charging device of claim 12, wherein the supply power connector includes a door opener engaging the door to move the door from the closed position to the open position.

16. The supply charging device of claim 12, wherein the guide member includes a funnel guiding the guide feature of the receive power connector into the receptacle.

17. The supply charging device of claim 12, wherein the supply housing includes a flange configured to be mounted to a panel, the supply housing having a base extending rearward from the flange through a panel cutout in the panel, the supply charging device further comprising a retaining plate coupled to the rear of the supply housing, a panel gap being defined between the retaining plate and the rear of the supply housing with the panel received between the flange and the retaining plate.

18. The supply charging device of claim 12, wherein the supply housing includes a locating feature received in a cutout of the panel, the locating feature configured to engage the panel to control an amount of floating movement of the supply power connector relative to the panel.

19. The supply charging device of claim 12, wherein the float element biases the supply power connector to a resting position relative to the panel, the supply power connector movable from the resting position to an offset position, the float element returning the supply power connector from the offset position to the resting position when the supply power connector is released.

20. A charging system comprising:
a mobile charging device including a receive power connector having a receive housing extending between a front and a rear, the receive power connector having a mating end at the front, the receive housing configured to be mounted to a body of a mobile device, the receive housing including a receive contact chamber extending between the front and the rear, the receive housing including a receive guide member having angled guide walls, the receive power connector including receive power contacts received in the receive contact chamber, the receive power connector including a first door at a front of the receive contact chamber, the first door movable between a closed position and an open position, the first door restricting access to the receive contact chamber in the closed position from an exterior of the receive power connector; and a supply charging device including a supply power connector having a supply power connector having a supply housing extending between a front and a rear, the supply housing configured to be coupled to a panel, the supply power connector having a mating end at the front, the supply housing including a supply contact chamber extending between the front and the rear, the supply housing including a receptacle at the mating end that receives the mating end of the receive power connector, the supply housing including a supply guide member at the mating end forward of the receptacle configured to engage the receptacle guide member to guide the receive power connector into the receptacle, the supply power connector including a supply contact assembly received in the supply contact chamber, the supply contact assembly including a supply contact holder holding supply power contacts, the supply power connector including a second door between the supply contact chamber and the receptacle, the second door movable between a closed position and an open position, the second door restricting access to the supply contact chamber in the closed position from an exterior of the supply power connector, the supply charging device including a float element coupled to the supply housing, the float element configured to engage the panel to allow the supply power connector to float relative to the panel for aligning the mating end of the supply power connector with the receive power connector, the supply charging device including a sealing boot coupled to the supply housing and configured to be sealed to the panel to provide an environmental seal between the supply power connector and the panel, the sealing boot being flexible to maintain sealing between the supply housing and the panel as the supply power connector floats relative to the panel during mating with the receive power connector.

* * * * *